US006365986B1

(12) United States Patent
Nonome

(10) Patent No.: US 6,365,986 B1
(45) Date of Patent: Apr. 2, 2002

(54) DOOR LOCK CONTROLLER

(75) Inventor: Katsuhiko Nonome, Nagoya (JP)

(73) Assignees: Autonetworks Technologies, Ltd., Nagoya; Sumitomo Wiring Systems, Ltd., Mie; Sumitomo Electric Industries, Ltd., Osaka, all of (JP)

( * ) Notice: Subject to any disclaimer, the term of this patent is extended or adjusted under 35 U.S.C. 154(b) by 0 days.

(21) Appl. No.: 09/520,788

(22) Filed: Mar. 8, 2000

(30) Foreign Application Priority Data

Jun. 7, 1999 (JP) .......................................... 11-159631

(51) Int. Cl.[7] .......................... B60R 25/00; G08C 19/00

(52) U.S. Cl. ................................ 307/10.01; 307/10.02; 340/825.31

(58) Field of Search ........................... 307/10.01, 10.02, 307/10.03; 180/287; 340/825.69, 825.54, 825.31

(56) References Cited

U.S. PATENT DOCUMENTS 5,965,953 A * 10/1999 Ikeda et al. ................ 307/10.2

* cited by examiner

*Primary Examiner*—Rajnikant B. Patel
(74) *Attorney, Agent, or Firm*—Oliff & Berridge, PLC

(57) ABSTRACT

A door lock controller including input switches wherein, upon reception of a predetermined operational input to instruct locking or unlocking of a vehicle door, output signals thereof are switched from OFF to ON for a predetermined duration of time, and a microcomputer that locks or unlocks the vehicle door by drive control of a door lock motor upon detection of switching of the output signals that are output from the input switches from OFF to ON. In the door lock controller, upon return from a reset state to a normal operating state, the microcomputer is set up in such manner as to return with a forcible assumption that the output signals from the input switches is ON.

3 Claims, 4 Drawing Sheets

RESET STATE
NON-RESET
RESET
C1
C2

MANUAL SWITCH (INPUT SWITCH 1)
ON
OFF
A1

KEY-INTERLOCKED SWITCH (INPUT SWITCH 3)
ON
OFF
A2

RECOGNITION BY MICROCOMPUTER
ON
OFF
D2

OUTPUT FROM MICROCOMPUTER
OPERATING
OFF
B1
B2
s0 s1 s2 s3
t0 t1 t2 t3 t4
(t)

DOOR LOCK CONTROLLER

BACKGROUND OF THE INVENTION

1. Field of the Invention

The present invention relates to a door lock controller.

2. Description of the Related Art

FIG. 2 is a block diagram showing a conventional structure of a door lock controller that the invention is applied to. The door lock controller comprises input switches (operational input reception section) 1 and 3 for reception of a vehicle door locking or unlocking command and an electronic control unit 7 for drive control of a door lock motor 5 according to the input contents that are input through the input switches 1 and 3.

The input switch 1 is a manual switch that is provided on inside of a door at a driver's seat for reception of a locking or unlocking command at on-off switching by the driver. The input switch 3 is a key-interlocked switch for reception of the locking or unlocking command at on-off switching that is interlocked with a locking or unlocking key operation at a key cylinder.

Each of the input switches 1 and 3 is provided respectively with two output signal lines 1*a* and 1*b*, or 3*a* and 3*b*, that are connected to input circuits 11 and 13, or 15 and 17, of the later-described electronic control unit 7; when the locking or unlocking command is not received, both of the output signals that come through the output signal lines 1*a* and 1*b* as well as 3*a* and 3*b* are maintained to be OFF and, upon reception of the locking signal, the output signals from the output signal lines 1*a* and 3*a* are switched from OFF to ON for a predetermined duration of time while, upon reception of the unlocking signal, the output signals from the output signal lines 1*b* and 3*b* are switched from OFF to ON for a predetermined duration of time (see FIGS. 3(*a*) and 3(*b*)).

Both of the input switches 1 and 3 have a structure wherein an operating piece thereof 1*c* or 3*c* that is normally set at OFF position is switched to a-contact side or b-contact side for a predetermined duration of time upon reception of the locking or unlocking command, which causes the output signal lines la and 3*a* or 1*b* and 3*b* to be grounded for the predetermined duration of time and thus the output signals from the output lines 1*a* and 3*a* or 1*b* and 3*b* are caused to switch from OFF to ON for the predetermined duration of time.

The electronic control unit 7 comprises the input circuits 11, 13, 15 and 17 for reception of output signals from the input switches 1 and 3, a microcomputer 19 for driving the door lock motor 5 according to the output signals from the input switches 1 and 3 which are received through the input circuits 11, 13, 15 and 17, output circuits 21 and 23 for driving the door lock motor 5 according to the controls of the microcomputer 19, and a power supply circuit 25 for generation of electric power source for the microcomputer 19.

The input circuits 11, 13, 15 and 17 are respectively connected, at one end, to input ports Pa1 through Pa4 of the microcomputer 19 and, at the other end, after being branched into two, are connected to the positive side of a battery 27 and to corresponding output signal lines 1*a* and 1*b* as well as 3*a* and 3*b* of the input switches 1 and 3. Accordingly, when the operating pieces 1*c* and 3*c* of the switches 1 and 3 are in the OFF position, all the input levels at the input ports Pa1 through Pa4 of the microcomputer 19 are high; when the operating pieces 1*c* and 3*c* are connected to the a-contact side, the inputs at the input ports Pa1 and Pa3 shift from a high level to a low level, and, when the operating pieces 1*c* and 3*c* are connected to the b-contact side, the inputs at the input ports Pa2 and Pa4 shift from the high level to the low level.

This causes the microcomputer 19 to recognize the switching from OFF to ON at the output signal from the input switch 1, which corresponds to locking or unlocking, through detection of shifts in the inputs from the high level to the low level at input ports Pa1 and Pa2, and to recognize the switching from OFF to ON at the output signal from the input switch 3, which corresponds to locking or unlocking, through detection of shifts in the inputs from the high level to the low level at input ports Pa3 and Pa4.

The output circuits 21 and 23 comprises: relays 21*a* and 23*a* for switching the connection of positive and negative power supply lines 5*a* and 5*b* for the door lock motor 5 either to the battery 27 side or to the ground side, and transistors 21*b* and 23*b* for driving the relays 21*a* and 23*a* in response to the shifts in the level of the outputs from the output ports Pb1 and Pb2 of the microcomputer 19 between the high level and the low level.

When the outputs from the output ports Pb1 and Pb2 of the microcomputer 19 are at the low level, the transistors 21*b* and 23*b* are turned off, and the relays 21*a* and 23*a* connect the power supply lines 5*a* and 5*b* for the door lock motor 5 to the ground. When the outputs from the output ports Pb1 and Pb2 of the microcomputer 19 shift to the high level, the transistors 21*b* and 23*b* are turned on and, the circuits being electrified with continuity from a positive terminal of the battery 27 to the ground via the relay coils 31 of the relays 21*a* and 23*a* and via transistors 21*b* and 23*b*, the relay coils 31 being excited, the operating pieces 33 of the relays 21*a* and 23*a* switching from the ground-side contact to the battery-side contact, the relays 21*a* and 23*a* connect the power supply lines 5*a* and 5*b* for the door lock motor 5 to the positive terminal side of the battery 27. The operating pieces 33 of the relays 21*a* and 23*a* are switched to the ground-side upon de-excitation of the relay coils 31 when the transistors 21*b* and 23*b* are turned off.

In a normal operating state, the microcomputer 19 controls the drive of the door lock motor 5 via the output circuits 21 and 23 through switching of the output state at the output ports Pb1 and Pb2, according to the contents of input from the input ports Pa1 through Pa4.

That is, the microcomputer 19 maintains the outputs at both of the output ports Pb1 and Pb2 to be low in a case of receiving neither locking commands nor unlocking commands from the input switches 1 and 3 while the output signals that are received from the input switches 1 and 3 through the input circuits 11, 13, 15 and 17 and the input ports Pa1 through Pa3 are OFF, wherein both the power supply lines 5*a* and 5*b* for the door lock motor 5 are connected to the ground by the relays 21*a* and 23*a*.

When the output signals that are received from the input switches 1 and 3 through the input ports Pa1 and Pa3 are switched from OFF to ON for the predetermined duration of time upon reception of the locking commands from the input switches 1 and 3 as shown by A1 and A2 in FIGS. 3(*a*) and 3(*b*), the detection of switching from OFF to ON causes the microcomputer 19 to recognize the reception of the locking command and accordingly the door is locked by switching of the output level at the output port Pb1 from the low level to the high level for the predetermined duration of time as shown by B1 and B2 in FIG. 3(*c*) while the output at the output port Pb2 is maintained at the low level. In a case wherein the output from the output port Pb1 is switched to the high level at this time, since the power supply line 5*a* is connected to the positive terminal side of the battery 27 by the relay 21*a* , the electric current from the battery 27 flows from the power supply line 5*a* side to the motor 5 and forward drive (or reverse drive) of the motor for the predetermined duration of time effects locking of the door.

When the output signals that are received from the input switches 1 and 3 through the input ports Pa2 and Pa4 are switched from OFF to ON for the predetermined duration of time upon reception of the unlocking commands from the input switches 1 and 3 as shown by A1 and A2 in FIGS. 3(*a*) and 3(*b*), the detection of switching from OFF to ON causes the microcomputer 19 to recognize the reception of the unlocking command and accordingly the door is unlocked by switching of the output level at the output port Pb2 from the low level to the high level for the predetermined duration of time as shown by B1 and B2 in FIG. 3(*c*) while the output at the output port Pb1 is maintained at the low level. In a case wherein the output from the output port Pb2 is switched to the high level at this time, since the power supply line 5*b* is connected to the positive terminal side of the battery 27 by the relay 23*a*, the electric current from the battery 27 flows from the power supply line 5*b* side to the motor 5 and the reverse drive (or forward drive) of the motor for the predetermined duration of time effects unlocking of the door.

Incidentally, the microcomputer 19 is provided with a setting section 19*a* for presetting and registration of initial data in advance for initial setting at startup or reset (for example, a setup information recording section, such as a ROM) so that the microcomputer 19 can be initialized and set up according to the initial data at the setting section 19*a* in the case of startup and reset.

In the conventional door lock controller with the structure as described above, the microcomputer 19 is so set up as to reset on forcible assumption that the output signals from the input switches 1 and 3 are OFF signals that are input through the input ports Pa1 through Pa4.

Accordingly, in a case wherein the microcomputer 19 in the conventional door lock controller wherein the locking or unlocking command is input to the input switches 1 and 3 is reset due to such a mistake as caused by noise as shown by C1 in FIG. 4(*a*) during a period of time when the output signals from the input switches 1 and 3 are maintained to be ON as shown by A2 in FIG. 4(*c*), upon return to the normal operating state from the state wherein the reset is effected, as shown by D1 in FIG. 4(*d*), an erroneous recognition by the microcomputer 19 that the output signals from the input switches 1 and 3 have changed from OFF to ON, or an erroneous recognition that the locking command or the unlocking command has been received may result with erroneous output of the locking or unlocking command to the door lock motor 5, as shown by B3 in FIG. 4(*e*). Consequently, in spite the fact that the locking command or unlocking command has been received only once from the input switch 3, the door lock motor 5 carries out the locking or unlocking operation twice with the erroneous recognition that the command has been received twice and, since a user may recognize this as an erroneous operation, a problem is that the user is impressed with a sense of incongruity.

To describe the returning manner of the microcomputer 19 from the reset state more in detail, the microcomputer 19 is reset by noise or the like at time s0 and the reset is cancelled at time s1 and, when the microcomputer 19 starts initializing operation, the initializing operation forcibly sets the output signals that are input from the input switches 1 and 3 through the input ports Pa1 through Pa4 to be OFF by the initializing operation. Nextly, at time s2, upon completion of the initializing operation and return of the microcomputer 19 to the normal operating state, based on the contents of the initial setting, the microcomputer 19 forcibly assumes that the output signals that are input through the input ports Pa1 through Pa4 from the input switches 1 and 3 are OFF to return to the normal operating state. At time s3, when the microcomputer 19 detects actual output state (ON state) of the output signals that are input through the input ports Pa1 through Pa4 from the input switches 1 and 3, in spite that the output signals have been maintained at ON, output for locking or unlocking is carried out with erroneous recognition of switching from OFF to ON. For the period from time s0 to time s2, recognition contents of the output signals from the input switches 1 and 3 by the microcomputer 19 are undefined.

SUMMARY OF THE INVENTION

With consideration into the above-described problems, it is an object of the present invention to provide a door lock controller that enables prevention of erroneous double locking or unlocking operation by the door lock motor for each single input of locking or unlocking command in a case wherein the microcomputer is reset under influence of noise or the like.

In order to achieve the above object, according to the invention, there is provided a door lock controller comprising: an operational input reception section wherein, upon reception of a predetermined operational input to instruct locking or unlocking of a vehicle door, an output signal thereof is switched from OFF to ON for a predetermined duration of time; and a microcomputer that locks or unlocks the vehicle door by drive control of a door lock motor upon detection of switching of the output signal that is output from the operational input reception section from OFF to ON, wherein upon return from a reset state to a normal operating state, the microcomputer is set up in such manner as to return with a forcible assumption that the output signal that is input from the operational input reception section is ON.

DETAILED DESCRIPTION OF THE PREFERRED EMBODIMENT

Figure 1:
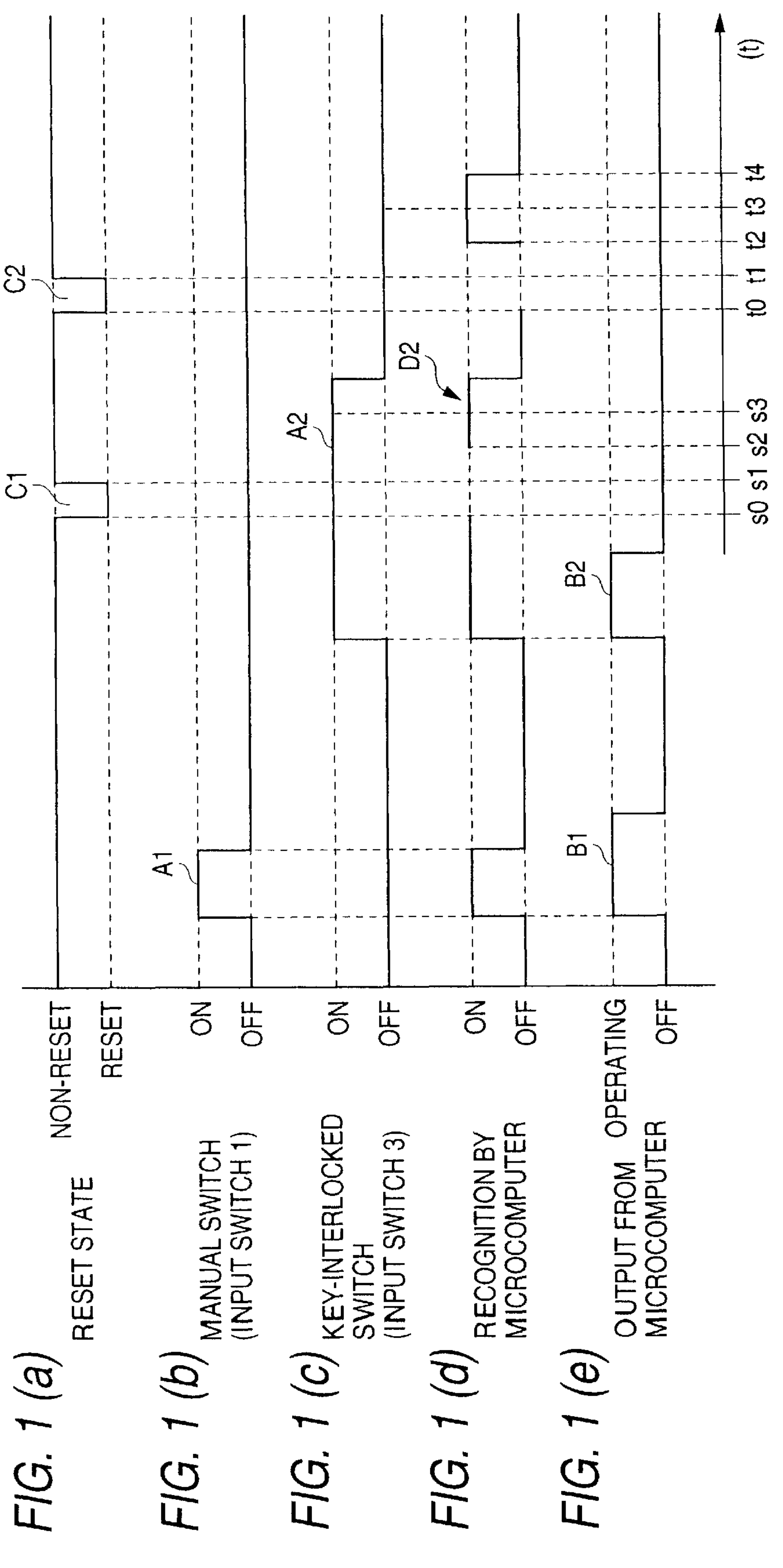
FIG. 1 is a timing chart that shows the controlling operations of a door lock controller according to an embodiment of the invention.

FIG. 1 is a timing chart that shows controlling operations by a door lock controller according to an embodiment of the invention. The door lock controller according to the embodiment has a basic hardware structure that is similar to the conventional structure that is shown in FIG. 2 and therefore, only the characterized parts of the door lock controller according to the embodiment are described here.

Figure 2:
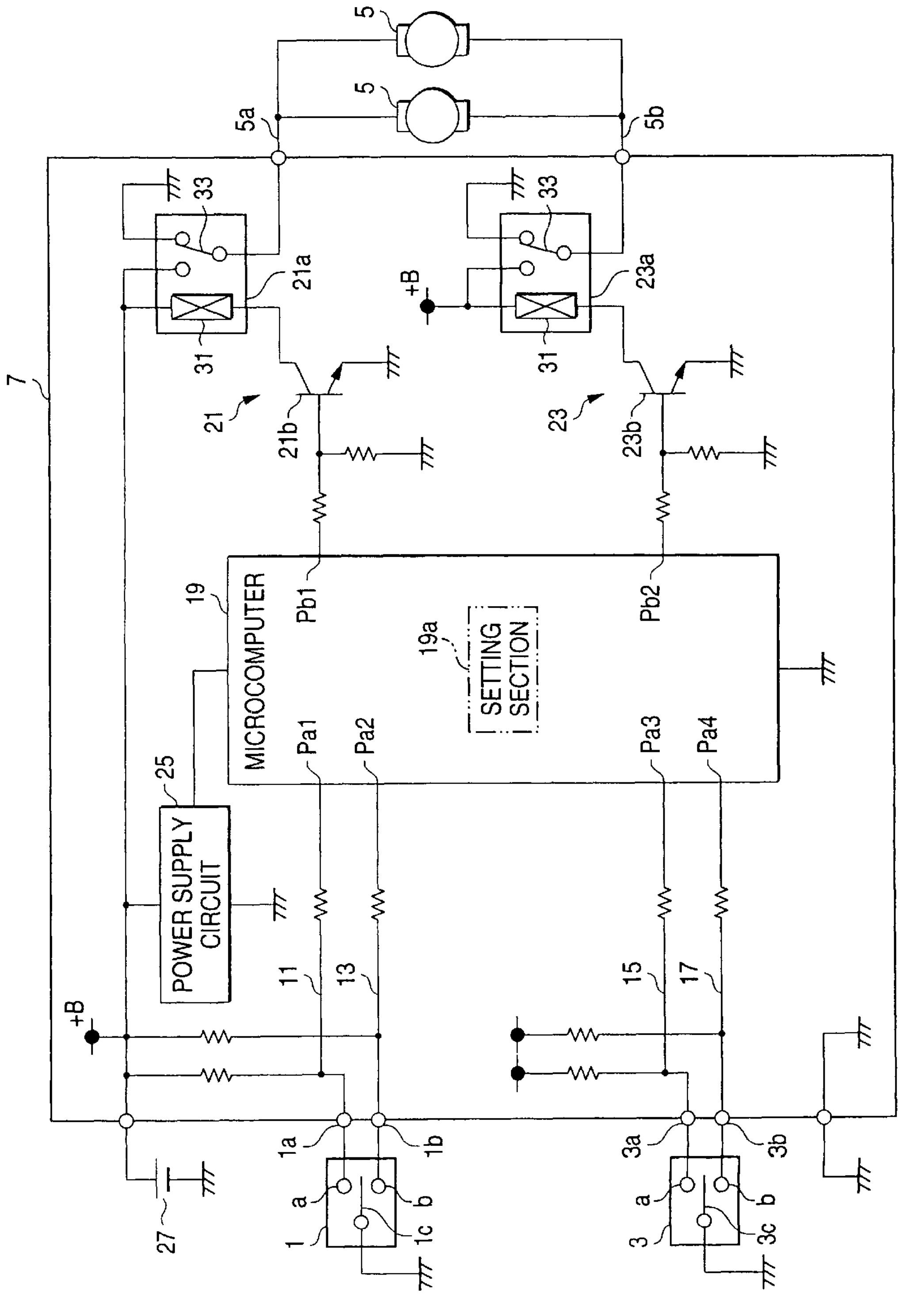
FIG. 2 (RELATED ART)
FIG. 2 is a block diagram that shows conventional structure of the door lock controller.
Figure 3:
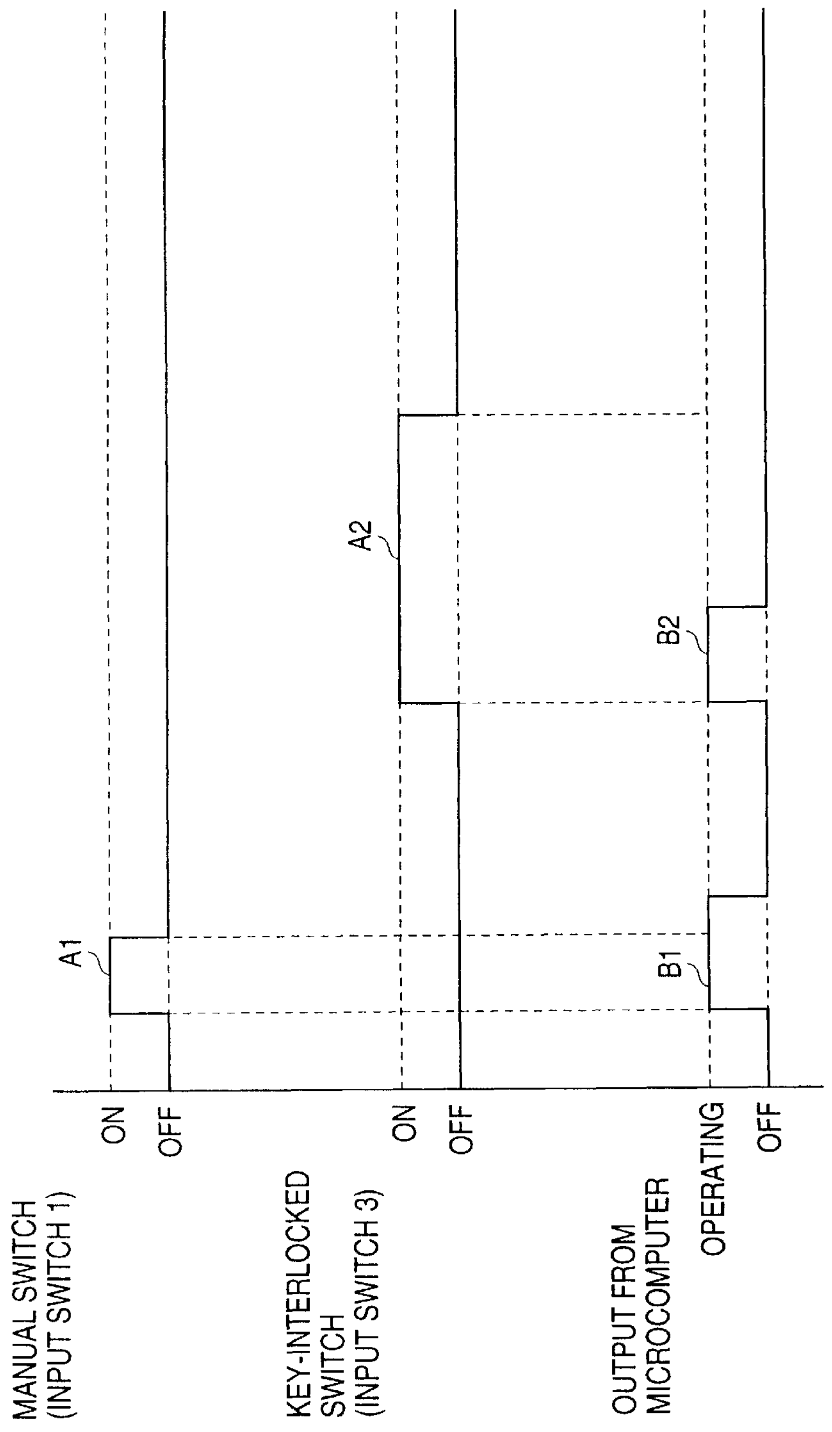
PRIOR ART FIG. 3 (a)
FIG. 3 is a timing chart that shows the normal control operations of the door lock controller in FIG. 2.
Figure 4:
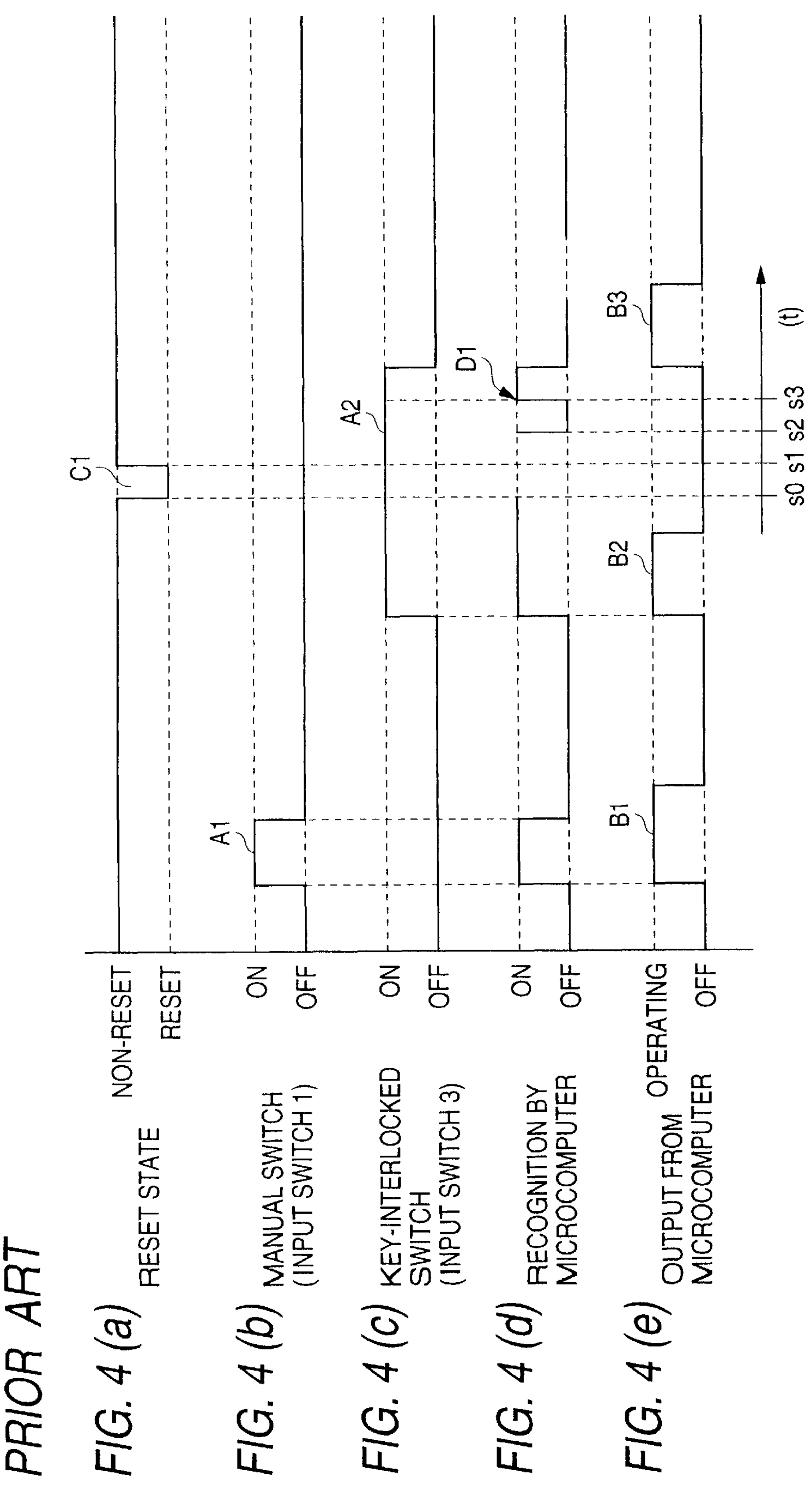
PRIOR ART FIG. 4 (a)
FIG. 4 is a timing chart that shows the controlling operations at the time of reset by noise or the like in the door lock controller in FIG. 2.

As FIG. 2 is referred to, in the door lock controller according to the embodiment, initial data that indicates that all the output signals that are input from the operational switches 1 and 3 through the input ports Pa1 through Pa4 are registered at the setting section 19*a* of the microcomputer 19 as the initial data that should be read as the output state of the output signals that are input from the operational switches 1 and 3 through the input ports Pa1 through Pa4 when the microcomputer 19 returns from a state of reset by influence of noise or the like to a normal operating state.

That is, in this embodiment, the microcomputer 19 is so set as to return from the reset state to the normal operating state with forcible assumption that all the output signals that are input from the operational switches 1 and 3 through the input ports Pa1 through Pa4 are ON.

Accordingly, in this door lock controller, the input switches 1 and 3 receive the locking command or the unlocking command and even in the case wherein the microcomputer 19 is reset erroneously by influence of noise or the like as shown by C1 in FIG. 1(*a*) during the period when the output signals from the input switches 1 and 3 are maintained to be ON as shown by A2 in FIG. 1(*c*), since the microcomputer 19 returns with forcible assumption that all the output signals that are input from the operational switches 1 and 3 through the input ports Pa1 through Pa4 as shown by D2 in FIG. 1(*d*), when the microcomputer 19 returns to the normal processing sate on the cancellation of the reset state shown by C1 in FIG. 1(*a*), the conventional erroneous double locking or unlocking operations of the door lock motor 5 for the input of the single locking or unlocking command, which is caused by erroneous recognition of the output signals from the input switches 1 and 3 changing from OFF to ON (that is, erroneous recognition of additional input of locking or unlocking command) by the microcomputer 19.

To describe more in detail the return operation of the microcomputer according to the embodiment with references to FIG. 1, after the microcomputer 19 is reset by noise or the like at time s0, the reset is cancelled to start the initializing operation of the microcomputer 19 at time s1 and, with the initialization, all the output signals that are input through the input ports Pa1 through Pa4 from the input switches 1 and 3 are forcibly set to ON. Upon completion of the initializing operation for return of the microcomputer 19 to the normal operating state at time s2, the microcomputer returns to the normal operating state with forcible assumption that all the output signals that are input from the input switches 1 and 3 through the input ports Pa1 through Pa4 are ON, based on the contents of the initial setting. Therefore, even in the case wherein the microcomputer 19 detects the actual output state (ON state) of the output signals that are input from the input switches 1 and 3 through the input ports Pa1 through Pa4 at time s3, the recognition by the microcomputer 19 that the output signals are ON remains true, and thus occurrence of conventional erroneous recognition can be prevented.

In a case wherein the microcomputer 19 is reset erroneously by influence of noise or the like, as shown by C2 in FIG. 1(*a*), when the output signals that are input from the operational switches 1 and 3 through the input ports Pa1 through Pa4 into the microcomputer 19 are OFF, the following operations are carried out for return.

After the microcomputer 19 is reset by noise or the like at time t0, the reset is cancelled to start the initializing operation of the microcomputer 19 at time t1 and, with the initialization, all the output signals that are input through the input ports Pa1 through Pa4 from the input switches 1 and 3 are forcibly set to ON. Upon completion of the initializing operation for return of the microcomputer 19 to the normal operating state at time t2, the microcomputer returns to the normal operating state with forcible assumption that all the output signals that are input from the input switches 1 and 3 through the input ports Pa1 through Pa4 are ON, based on the contents of the initial setting. The microcomputer 19 detects the actual output state (OFF state) of the output signals that are input from the input switches 1 and 3 through the input ports Pa1 through Pa4 at time t3, and then the recognition on the output state of the output signals are changed to the actual output state (OFF) at time t4. In the period from time t0 to time t4, no erroneous command for locking or unlocking will be output from the microcomputer 19. Although the output signals from the input switches 1 and 3 are forcibly recognized as ON at time t2, the recognition by the microcomputer 19 on the output state of the output signals in the state at time t2 or the before is not defined and therefore, no erroneous recognition of input of locking or unlocking command will occur.

As described above, in this embodiment, since the microcomputer 19 is so set as to return with forcible assumption that the output signals that are input from the input switches 1 and 3 are ON when the initial setting at the setting section 19*a* of the microcomputer 19 returns from the reset state to the normal operating state, in the case wherein the microcomputer 19 is reset by influence of noise or the like during the period wherein the output signals from the input switches 1 and 3 are switched to ON with input of the locking or unlocking signal, the microcomputer 19 is prevented from erroneously recognizing that the output signals have been switched from OFF to ON in spite that the output signals from the input switches 1 and 3 are maintained to be ON at the time of return from the reset state to the normal operating state, and this is effective in prevention of the user from being impressed with the sense of incongruity which is caused conventionally by double locking or unlocking operation for the door lock motor 5 against the single input of the locking or unlocking command in the case wherein the microcomputer 19 is reset by influence of noise or the like.

According to the invention, when returning from the reset state to the normal operating state, since the microcomputer is so set as to return with forcible assumption that the output signal that is input from the operational input reception section is ON, in the case wherein the microcomputer is reset by influence of noise or the like during the period wherein the output signal from the operational input reception section is switched to ON with input of the locking or unlocking command, the microcomputer is prevented from erroneously recognizing that the output signal has been switched from OFF to ON in spite that the output signal from the operational input reception section is so maintained to be ON as is conventional at the time of return from the reset state to the normal operating state, and this is effective in prevention of the user from being impressed with the sense of incongruity which is caused conventionally by double locking or unlocking operation for the door lock motor against the single input of the locking or unlocking command in the case wherein the microcomputer is reset by influence of noise or the like.

What is claimed is:

1. A door lock controller comprising:

an operational input reception section wherein, upon reception of a predetermined operational input to instruct locking or unlocking of a vehicle door, an output signal thereof is switched from OFF to ON for a predetermined duration of time; and a microcomputer that locks or unlocks the vehicle door by drive control of a door lock motor upon detection of switching of the output signal that is output from said operational input reception section from OFF to ON, wherein upon return from a reset state to a normal operating state, said microcomputer is set up in such manner as to return with a forcible assumption that the output signal that is input from said operational input reception section is ON.

2. The door lock controller according to claim 1, wherein said operational input reception section includes a manual switch for reception of a locking or unlocking command at on-off switching by a user.

3. The door lock controller according to claim 1, wherein said operational input reception section includes a key-interlocked switch for reception of a locking or unlocking command at on-off switching that is interlocked with a locking or unlocking key operation at a key cylinder.

* * * * *